United States Patent Office 3,421,881
Patented Jan. 14, 1969

3,421,881
METHOD FOR MODIFYING THE GROWTH CHARACTERISTICS OF PLANTS
John K. Leasure, Carbondale, Ill., and Dorsey R. Mussell, Clare, Mich., assignors to The Dow Chemical Company, Midland, Mich., a corporation of Delaware
No Drawing. Filed May 11, 1966, Ser. No. 549,175
The portion of the term of the patent subsequent to May 11, 1982, has been disclaimed
U.S. Cl. 71—79                           2 Claims
Int. Cl. A01n 5/00; A01n 9/60

ABSTRACT OF THE DISCLOSURE

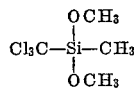

Applied to living plants and their parts alters or inhibits growth or kills the plants.

Description of the invention

This invention is concerned with the modification of the growth characteristics of plants and is particularly directed to compositions and methods for the suppression and control of the growth of germinant seeds, emerging seedlings and established plants of many undesirable weed species, and for promoting the maturing of crops and facilitating their harvest.

According to the present invention, it has been discovered that the growth characteristics of many plants may be modified or altered by exposing plants or plant parts to the action of a growth-altering amount of the compound trichloromethyl-dimethoxy-methylsilane of the formula:

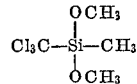

More particularly, it has been discovered that the growth of germinant seeds, seedlings and established vegetation may be suppressed and inhibited by exposing the seeds, seedlings or the roots or above-ground portions of growing plants to the action of a growth-altering or growth-inhibiting amount of the said compound. It has been discovered further that with proper control of the dosage of the silane compound, the maturation of many crop plants may be facilitated and their harvest promoted without substantial injury to that portion of the plant to be harvested. Moreover, it has been found that the compound has a substantial degree of toxicity for germinant seeds while often leaving emerged plants unhurt. Thus, they are adapted to be employed for the selective control of unemerged weed seedlings amidst crop plants.

The silane compound is a liquid that boils at 80° C. under 25 millimeters mercury pressure, and it is somewhat soluble in many organic solvents and of very little solubility in water.

The exposure of a viable form of plant, or of plants and plant parts, to the action of the silane compound gives rise to varying responses depending upon the nature of the plant or plant part, the stage of growth or maturity of the plant, and the dosage of silane compound at which the exposure is carried out. When large dosages are dispersed in growth media, a persistent inhibition of the growth of the seeds, emerging seedlings and established plants of many plant species is obtained. The weathering action of the sun, rain and possibly the decomposition of the silane compound by the action of bacteria, eventually reduces its concentration in growth medium. The application of large dosages to the foliage of established vegetation suppresses the growth of many broad leaf and narrow leaf plant species.

Where plant maturation is concerned, the silane compound is applied to the foliage of crops at a time near the end of their normal growing season and at a dosage sufficient to accelerate the maturing of the crop. This treatment accomplishes an early and uniform ripening of the fruit or other agricultural product and a rapid defoliation of the plant so as to facilitate the harvest of the crop. In certain instances, as with rice and milo, the treatment induces a dehydration effect which results in a decrease in the moisture content of the grain. Such a treatment permits an early harvest of the grain crop.

The exposure of the plant to the action of a growth-altering amount of the silane is essential for the practice of the present invention. The exact dosage to be employed to obtain such exposure is dependent upon such factors as soil type, depth to which the compound is distributed in the soil, the amount of rainfall as well as upon the plant species to be controlled and the stage of growth thereof. In selective pre-emergence herbicide applications, good results are obtained when the germinant seeds are exposed to dosages of from 10 to 50 pounds or more of the silane compound per acre. In soil, good results are obtained when the compound is distributed therein in amounts of from 0.5 to 100 parts or more by weight per million parts by weight of soil. Where plant maturation is concerned, good results are obtained at dosages of from 0.1 to 10 pounds of the silane compound per acre.

The method of the present invention may be carried out by applying to the above-ground portion of plants or by applying to the growth media the unmodified silane compound. However, the present method also embraces the employment of a liquid or dust composition containing said compound. In such usage, the compound may be modified with one or more of a plurality of additaments or herbicide adjuvants such as water, petroleum distillates, or other organic solvent carriers, surface active dispersing agents and finely divided inert solids. Depending upon the concentration of the toxicant, such augmented compositions are adapted to be distributed in or on the soil or on the above-ground portion of the plants or employed as concentrates and subsequently diluted with additional inert carrier to produce the ultimate treating compositions.

The exact concentration of silane compound to be employed in compositions for the treatment of growth media and plants is not critical and may vary considerably provided the required dosage of active agent is supplied in the growth media or upon the above-ground surfaces of plants. The concentration of toxicant in liquid compositions employed to supply the desired dosage generally is from about 0.1 to 50 percent by weight, although concentrations of 0.0001 percent by weight may be employed in irrigation treatments of soil. In dusts, the concentration of toxicant may be from 0.5 to 50 percent by weight, although concentrations as low as 0.1 percent are sometimes employed. In compositions to be employed as concentrates, the toxicant oftentimes is present in a concentration of from about 1 to 98 percent by weight.

The quantity of treating composition to be applied may vary considerably provided the required dosage of active ingredient is applied in sufficient of the finished composition adequately to cover the vegetation to be treated or to facilitate the penetration and distribution of the active ingredient in growth media. The required amount of active ingredient in the soil conveniently may be supplied per acre treated in from 40 to 27,000 gallons or more of the aqueous carrier, in 5 to 50 gallons of organic solvent or in from 50 to 2,000 pounds of inert solid carrier. In the treatment of unemerged and seedling weeds, good coverage is obtained when using from 10 to 100 gallons or more of finished spray composition per acre. Where large succulent vegetation is concerned, it is frequently desirable to employ up to 250 gallons or more of the finished spray composition per acre to assure complete coverage of the above-ground portion of the vegetation. In the application of dusts to plant foliage, good results are obtained with from 50 to 2,000 pounds of finished dust composition per acre, the only requirements being that the required toxicant dosage be supplied in sufficient dust to achieve good coverage of the foliage.

Liquid compositions containing the desired amount of the silane compound may be prepared by dissolving the toxicants in an organic liquid such as acetone, xylene or petroleum distillates or by dispersing the toxicant in water with or without the aid of a suitable surface active dispersing agent such as an ionic or non-ionic emulsifying agent. The aqueous compositions may contain one or more water-immiscible solvents for the silane compound. In such compositions, the carrier comprises an aqueous emulsion, that is, a mixture of water-immiscible solvent, emulsifying agent and water. The choice of dispersing and emulsifying agent and the amount thereof employed is dictated by the nature of the composition type and by the ability of the agent to facilitate the dispersion of the compound in the carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like. The surface active dispersing agents are generally employed in the liquid compositions in the amount of from 1 to 20 percent by weight of the combined weight of the silane compound and the surface active agent.

In the preparation of dust compositions, the silane compound is dispersed in and on a finely divided inert solid such as talc, chalk, gypsum and the like. In such operations, the carrier is mechanically ground with the compounds or wet with a volatile organic solvent solution thereof.

Similarly, dust compositions containing the compound may be prepared from various of the solid surface active dispersing agents such as bentonite, fuller's earth, attapulgite and other clays. Depending upon the proportions of ingredients, these dust compositions may be employed as concentrates and subsequently diluted with additional solid surface active dispersing agent or with talc, chalk, gypsum and the like to obtain the desired amount of active ingredient adapted to be employed for the control of the growth of vegetation. Also, such concentrate dust compositions may be dispersed in water with or without the aid of a dispersing agent to form spray mixtures.

When operating in accordance with the present invention, growth-inhibiting amounts of the compound or a composition containing the compound are dispersed in any convenient fashion in soil or other growth media, i.e., by simple mixing with the growth media, by applying to the surface of soil and thereafter dragging or disking into the soil to the desired depth, or by employing a liquid carrier to accomplish the penetration and impregnation. The application of the spray and dust compositions to the surface of soil or to the above-ground surfaces of plants may be carried out by conventional methods, for example, with power dusters, boom or hand sprayers and spray dusters.

In a further method, the distribution in soil may be accomplished by introducing the toxicant in the water employed to irrigate the soil. In such procedure, the amount of water may be varied in accordance with the porosity and water-holding capacity of the soil in order to obtain the desired depth of distribution of the toxicant.

The following examples illustrate the present invention but are not to be construed as limiting.

EXAMPLE 1

Four parts by weight of trichloromethyl dimethoxy methylsilane, 0.08 part by weight of sorbitan trioleate (Span 85) and 0.02 part of a sorbitan monolaurate polyoxyethylene derivative (Tween 80) were dispersed in 40 milliliters of acetone to produce a concentrate composition in the form of a water-dispersible liquid containing the silane compound as the active agent. Portions of this concentrate composition were dispersed in water to produce aqueous spray compositions containing 4,000 parts and 10,000 parts by weight of the silane compound per million parts by weight of ultimate mixture. These compositions were applied to the foliage of plots of various plant species which were about 4 inches tall. The treatments were carried out with conventional spraying equipment, the plants being sprayed to the point of run off. Similar plots of the various plant species were left untreated to serve as checks. After about 2 weeks, the plots were examined to ascertain what control of the growth of the plants had been obtained. Beans, as representative of legumes, generally, were almost completely killed at 10,000 parts per million but were unhurt at 4,000. Japanese millet was severely injured. Outright kill was rated at 20 percent.

At the time of the observations, the untreated check areas showed vigorously growing stands of the named plant species.

EXAMPLE 2

Water-dispersible concentrate compositions were prepared from trichloromethyl dimethoxy methylsilane exactly as described in Example 1 and portions of the resulting concentrates dispersed in water to prepare aqueous compositions which were thereafter applied to soil heavily seeded with various plant species. Observations were made of the control of the growth of the seeds and emerging seedlings of various plant species.

After about 4 weeks, the areas were examined to ascertain what control of the growth of seeds and emerging seedlings had been obtained. The concentrations and plant species employed together with the results obtained are set forth in the following table.

PERCENT KILL 50 pounds toxicant per acre:
    Japanese millet _____ 95
    Radish _____ 40
20 pounds toxicant per acre:
    Japanese millet _____ 85
    Beans _____ 100

The test results, foregoing, make evident the applicability of the subject compound for selective vegetation control.

EXAMPLE 3

One quarter of a pound of an alkylated aryl polyether alcohol (Triton X–100) is added with stirring to an aqueous dispersion containing 1 pound of trichloromethyl dimethoxy methylsilane per 100 gallons of ultimate mixture to produce an aqueous spray composition.

In a similar manner, 90 parts by weight of trichloromethyl dimethoxy methylsilane are mixed with 10 parts of a sorbitan monolaurate polyoxyethylene derivative (Tween 80) to produce a concentrate composition in the form of a water-dispersible liquid containing the silane compound.

Also, 25 parts by weight of trichloromethyl dimethoxy methyl silane, 60 parts of fuller's earth, 10 parts of diatomaceous earth, 2 parts of on alkyl sulfonate (Nacconal NR) and 1 part of a polymerized sodium salt of substituted benzoid alkyl sulfonic acid (Daxad No. 27) are mechanically mixed and ground together to prepare a concentrate composition in the form of a wettable powder.

These concentrate compositions are dispersed in water to prepare aqueous compositions which have very desirable wetting and penetrating properties. The latter aqueous compositions and the aqueous spray compositions as above prepared are adapted to be employed to distribute the silane compound in the soil or upon the foliage of plants in growth-altering amounts.

Trichloromethyl dimethoxy methylsilane is prepared, in one synthetic route, by reacting trichloromethylmethyldichlorosilane with two moles methanol in petroleum ether, all under anhydrous conditions. The procedure is essentially that of Shorr, 76 JACS 1390 (1954).

What is claimed is:

1. A method which comprises exposing a living plant part to the action of a growth-altering amount of trichloromethyl dimethoxy methylsilane.

2. Method of claim 1 wherein the plant part is a seed and it is contacted while it is in the earth.

References Cited

UNITED STATES PATENTS

| | | | |
|---|---|---|---|
| 2,923,095 | 2/1960 | Magimel-Pelonnier et al. | 47—58 |
| 3,151,969 | 10/1964 | Stevens | 71—65 |
| 3,183,076 | 5/1965 | Leasure et al. | 71—79 |

JAMES O. THOMAS, Jr., *Primary Examiner.*

U.S. Cl. X.R.

71—70, 76